US011312827B2

(12) United States Patent
Yee et al.

(10) Patent No.: US 11,312,827 B2
(45) Date of Patent: Apr. 26, 2022

(54) UNIAXIALLY-ORIENTED POLYMERIC FILMS, AND ARTICLES MADE THEREFROM

(71) Applicant: Dow Global Technologies LLC, Midland, MI (US)

(72) Inventors: Wu Aik Yee, Singapore (SG); Yijian Lin, Pearland, TX (US); Rajen M. Patel, Lake Jackson, TX (US); Fabricio Arteaga Larios, Freeport, TX (US); Jacquelyn A. Degroot, Freeport, TX (US); Mridula Kapur, Lake Jackson, TX (US); Yutaka Maehara, Kanagawa (JP)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/648,556

(22) PCT Filed: Oct. 8, 2018

(86) PCT No.: PCT/US2018/054792
§ 371 (c)(1),
(2) Date: Mar. 18, 2020

(87) PCT Pub. No.: WO2019/074811
PCT Pub. Date: Apr. 18, 2019

(65) Prior Publication Data
US 2020/0255608 A1 Aug. 13, 2020

Related U.S. Application Data

(60) Provisional application No. 62/570,166, filed on Oct. 10, 2017.

(51) Int. Cl.
*C08J 5/18* (2006.01)
*B32B 5/02* (2006.01)
*B32B 27/12* (2006.01)
*B32B 27/32* (2006.01)
*B32B 38/00* (2006.01)

(52) U.S. Cl.
CPC .............. *C08J 5/18* (2013.01); *B32B 5/022* (2013.01); *B32B 27/12* (2013.01); *B32B 27/327* (2013.01); *B32B 38/0012* (2013.01); *B32B 2038/0028* (2013.01); *B32B 2307/516* (2013.01); *B32B 2555/02* (2013.01); *C08J 2323/06* (2013.01)

(58) Field of Classification Search
CPC ......... C08J 5/18; C08J 2323/06; B32B 5/022; B32B 27/12; B32B 27/327; B32B 38/0012; B32B 2038/0028; B32B 2307/516; B32B 2555/02
See application file for complete search history.

(56) References Cited

U.S. PATENT DOCUMENTS

| 4,798,081 | A | 1/1989 | Hazlitt et al. |
| 4,867,937 | A | 9/1989 | Li et al. |
| 5,008,204 | A | 4/1991 | Stehling |
| 5,292,845 | A | 3/1994 | Kawasaki et al. |
| 5,977,251 | A | 11/1999 | Kao et al. |
| 6,423,420 | B1* | 7/2002 | Brant ................ B32B 27/32 264/173.15 |
| 7,498,282 | B2 | 3/2009 | Patel et al. |
| 8,034,461 | B2 | 10/2011 | Breese et al. |
| 8,372,931 | B2 | 2/2013 | Hermel-Davidock et al. |
| 8,440,125 | B2 | 5/2013 | Breese |
| 8,802,802 | B2 | 8/2014 | Breese |
| 9,358,760 | B2 | 6/2016 | Huyghe |
| 2003/0144426 | A1 | 7/2003 | Williams |
| 2005/0175803 | A1 | 8/2005 | Breese |
| 2005/0200046 | A1 | 9/2005 | Breese |
| 2007/0260016 | A1* | 11/2007 | Best ................ B32B 27/327 525/240 |
| 2013/0051710 | A1 | 2/2013 | Borchardt et al. |
| 2013/0266786 | A1 | 10/2013 | Malakoff et al. |
| 2016/0229158 | A1 | 8/2016 | Cavacas et al. |
| 2016/0271917 | A1 | 9/2016 | Nummila-Pakarinen et al. |
| 2017/0152377 | A1* | 6/2017 | Wang ................ B32B 27/28 |
| 2019/0062540 | A1* | 2/2019 | Den Doelder ............ C08J 5/18 |
| 2021/0009770 | A1* | 1/2021 | Bonavoglia ............ B32B 27/20 |

FOREIGN PATENT DOCUMENTS

| EP | 963408 | 12/1999 |
| EP | 3214116 | 9/2017 |
| WO | 1993/003093 | 2/1993 |
| WO | 2014/026949 | 2/2014 |

(Continued)

OTHER PUBLICATIONS

PMC, LLDPE Resin Properties Table, https://www.pmcplastics.com/materials/lldpe-resin/ (Year: 2021).*

(Continued)

*Primary Examiner* — Michael Zhang

(57) ABSTRACT

A uniaxially-oriented ethylene-based polymeric film having at least one layer comprising at least 65 wt. %, based on total amount of materials present in the at least one layer, of a linear low density polyethylene which exhibits each of the following properties: a CDBI of at least 60%; a melt index, I2, measured according to ASTM D 1238 (2.16 kg @190° C.), of 1.8 g/10 min to 10 g/10 min; a density of from 0.910 g/cc to 0.940 g/cc; and a Mw/Mn of less than 3.0.

9 Claims, No Drawings

(56) References Cited

FOREIGN PATENT DOCUMENTS

WO   WO-2015200741 A1 * 12/2015 ............... B32B 7/02
WO      2016097951       6/2016

OTHER PUBLICATIONS

Monrabal, et al., Macromol. Symp., 2007, pp. 71-79, vol. 257.
Randall, Rev. Macromol. Chem. Phys., 1989, pp. 201-317.
Wild et al., Journal of Polymer Science, Poly. Phys. Ed., 1982, pp. 441, vol. 20.
Williams and Ward, J. Polym. Sci., Polym. Letters, 1968, pp. 621-624, vol. 6.
PCT/US2018/054792, International Search Report and Written Opinion dated Jan. 16, 2019.
PCT/US2018/054792, International Preliminary Reporton Patentability dated Apr. 14, 2020.

* cited by examiner

UNIAXIALLY-ORIENTED POLYMERIC FILMS, AND ARTICLES MADE THEREFROM

TECHNICAL FIELD

Embodiments of the present disclosure generally relate to uniaxially-oriented films and applications of the uniaxially-oriented films to make articles, such as, for example, a hygiene article.

BACKGROUND

Non-breathable backsheets have become increasingly desirable for use in hygiene absorbent products, such as, for example, diapers, adult incontinence products, and feminine hygiene articles. Non-breathable backsheets may include a nonwoven substrate and a film laminated together, where the main objectives are to combine the key attributes of each material to provide good barrier properties (to primarily contain fluids), opacity, tensile properties, breathability (or lack thereof), and/or haptics (e.g., softness). Conventional non-breathable backsheets may be fabricated using a cast film process and tend to be thicker in order to provide sufficient film stiffness. However, thinner non-breathable backsheets are becoming desirable without adversely affecting film properties.

Accordingly, alternative films having good film properties (e.g., modulus, puncture force, tensile strength) and which allow for downgauging of films while maintaining its performance may be desired.

SUMMARY

Disclosed in embodiments herein are uniaxially-oriented ethylene-based polymeric films. The uniaxially-oriented ethylene-based polymeric films have at least one layer comprising at least 65 wt. %, based on total amount of materials present in the at least one layer, of a linear low density polyethylene which exhibits each of the following properties: a Comonomer Distribution Breadth Index (CDBI) of at least 60%; a melt index, $I_2$, measured according to ASTM D 1238 (2.16 kg @ 190° C.), of 1.8 g/10 min to 10 g/10 min; a density of from 0.910 g/cc to 0.940 g/cc; and a Mw/Mn of less than 3.0.

Also disclosed in embodiments herein are methods of manufacturing a uniaxially-oriented ethylene-based polymeric film. The methods comprise: (1) providing an ethylene-based polymeric film having at least one layer comprising at least 65 wt. %, based on total amount of materials present in the at least one layer, of a linear low density polyethylene (LLDPE) which exhibits each of the following properties: a Comonomer Distribution Breadth Index (CDBI) of at least 60%; a melt index, $I_2$, measured according to ASTM D 1238 (2.16 kg @ 190° C.), of 1.8 g/10 min to 10 g/10 min; a density of from 0.910 g/cc to 0.940 g/cc; and a Mw/Mn of less than 3.0; and (2) stretching the film in the machine direction to form a uniaxially-oriented ethylene-based polymeric film, wherein stretching is performed at a draw ratio of 2.5 to 5 at a draw temperature, Td, of 20° C. to 50° C. less than the peak melting temperature, Tm, of the linear low density polyethylene, wherein the draw ratio is the $$\frac{\text{cast film thickness prior to stretching}}{\text{cast film thickness after stretching}}.$$

Further disclosed in embodiments herein are composites. The composites comprise a uniaxially-oriented ethylene-based polymeric film laminated to a nonwoven. The film has at least one layer comprising at least 65 wt. %, based on total amount of materials present in the at least one layer, of a linear low density polyethylene which exhibits each of the following properties: a Comonomer Distribution Breadth Index (CDBI) of at least 60%; a melt index, $I_2$, measured according to ASTM D 1238 (2.16 kg @190° C.), of 1.8 g/10 min to 10 g/10 min; a density of from 0.910 g/cc to 0.940 g/cc; and a Mw/Mn of less than 3.0.

Even further disclosed in embodiments herein are hygiene articles. The hygiene articles comprise a composite. The composite comprises a uniaxially-oriented ethylene-based polymeric film laminated to a nonwoven. The film has at least one layer comprising at least 65 wt. %, based on total amount of materials present in the at least one layer, of a linear low density polyethylene which exhibits each of the following properties: a Comonomer Distribution Breadth Index (CDBI) of at least 60%; a melt index, $I_2$, measured according to ASTM D 1238 (2.16 kg @190° C.), of 1.8 g/10 min to 10 g/10 min; a density of from 0.910 g/cc to 0.940 g/cc; and a Mw/Mn of less than 3.0.

Even further disclosed in embodiments herein are hygiene articles. The hygiene articles comprise a uniaxially-oriented ethylene-based polymeric film laminated to a nonwoven. The film has at least one layer comprising at least 65 wt. %, based on total amount of materials present in the at least one layer, of a linear low density polyethylene which exhibits each of the following properties: a Comonomer Distribution Breadth Index (CDBI) of at least 60%; a melt index, $I_2$, measured according to ASTM D 1238 (2.16 kg @ 190° C.), of 1.8 g/10 min to 10 g/10 min; a density of from 0.910 g/cc to 0.940 g/cc; and a Mw/Mn of less than 3.0.

Additional features and advantages of the embodiments will be set forth in the detailed description which follows, and in part will be readily apparent to those skilled in the art from that description or recognized by practicing the embodiments described herein, including the detailed description and examples. It is to be understood that both the foregoing and the following description describe various embodiments and are intended to provide an overview or framework for understanding the nature and character of the claimed subject matter.

DETAILED DESCRIPTION

Reference will now be made in detail to embodiments of uniaxially-oriented films, composites comprising uniaxially-oriented films, and hygiene articles comprising uniaxially-oriented films, examples of which are further described in the description. The uniaxially-oriented films may be used to produce nonbreathable backsheets, which may be used in diapers, incontinence briefs, training pants, feminine hygiene products, and other similar items. It is noted, however, that this is merely an illustrative implementation of the embodiments disclosed herein. The embodiments are applicable to other technologies that are susceptible to similar problems as those discussed above. For example, uniaxially-oriented films may also be used to produce wipes, face masks, tissues, bandages, wound dressings, and garments, such as, surgical gowns, are clearly within the purview of the present embodiments. As used herein, "uniaxially-oriented film" refers to a film that has been stretched in a single direction (e.g., in only the machine direction or in only the cross-direction). In some embodiments, the film is uniaxially-oriented film in the machine direction.

In embodiments herein, the uniaxially-oriented films are ethylene-based. As used herein in reference to uniaxially-oriented films, "ethylene-based" means that the uniaxially-oriented films are comprised of greater than 50%, by total weight of the uniaxially-oriented film, of ethylene-based resins. "Ethylene-based resin" refers to a homopolymer of ethylene or a copolymer of ethylene with one or more comonomers with a majority of its polymer units derived from ethylene. This can include, for example, low density polyethylene (LDPE), linear low density polyethylene (LLDPE), medium density polyethylene (MDPE), or high density polyethylene (HDPE). Also disclosed herein are composites or hygiene articles comprising the uniaxially-oriented films. In some embodiments, the uniaxially-oriented ethylene-based polymeric film is a monolayer film. In other embodiments, the uniaxially-oriented ethylene-based polymeric film is a multilayer film.

The uniaxially-oriented ethylene-based polymeric films have at least one layer comprising at least 65 wt. %, based on total amount of materials present in the at least one layer, of a linear low density polyethylene ("LLDPE"). In some embodiments, the uniaxially-oriented ethylene-based polymeric films comprise at least 70 wt. %, based on total amount of materials present in the at least one layer, of the linear low density polyethylene. In other embodiments, the uniaxially-oriented ethylene-based polymeric films comprise at least 75 wt. %, based on total amount of materials present in the at least one layer, of the linear low density polyethylene. In further embodiments, the uniaxially-oriented ethylene-based polymeric films comprise at least 80 wt. %, 85 wt. %, 90 wt. %, 95 wt. %, 97 wt. % 99 wt. %, or 100 wt. %, based on total amount of materials present in the at least one layer, of the linear low density polyethylene. LLDPE The LLDPE includes linear or substantially linear polyethylene polymers produced by the copolymerization of an ethylene monomer and one or more alpha-olefin comonomers. The LLDPE comprises greater than 50%, by weight, of its units derived from the ethylene monomer, for example, at least 60%, at least 70%, at least 80%, at least 90%, at least 92%, at least 95%, at least 97%, by weight, of the units derived from the ethylene monomer; and less than 30%, for example, less than 25%, less than 20%, less than 15%, less than 10%, less than 5%, less than 3%, by weight, of units derived from the one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers include a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the alpha-olefin is selected from the group consisting of propylene, 1-butene, 1-pentene, 1-hexene, 4-methyl-1-pentene, 1-heptene, 1-octene, 1-nonene and 1-decene. In other embodiments, the alpha-olefin is selected from the group consisting of propylene, 1-butene, 1-hexene, and 1-octene. In further embodiments, the alpha-olefin is selected from the group consisting of 1-hexene and 1-octene. In even further embodiments, the ethylene-based polymer is an ethylene/α-olefin copolymer, wherein the alpha-olefin is 1-octene.

Any conventional ethylene (co)polymerization solution single reactor reaction processes may be employed to produce the LLDPE. One method of making the LLDPE disclosed herein is described in detail in U.S. Pat. No. 5,977,251, the disclosure of which is incorporated herein by reference in its entirety.

In one embodiment, the LLDPE is prepared via a polymerization process in a single solution phase loop reactor system, wherein the catalyst system comprises a metal-ligand complex of formula (I) below:

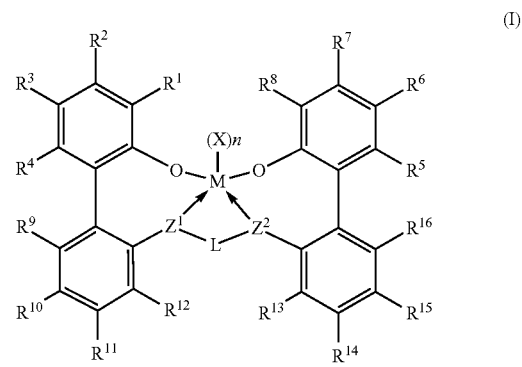

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; O is O (an oxygen atom); each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groupsin formula (I) (to which L is bonded) or the ($C_1$-$C_{40}$) heterohydrocarbylene has a portion that comprises a 1-atom to 10-atom linker backbone linking the two Z groupsin formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$) heterohydrocarbyl; and $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

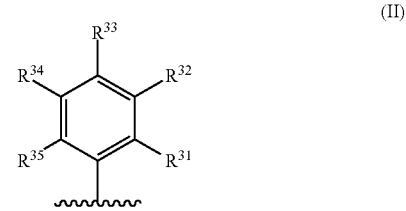

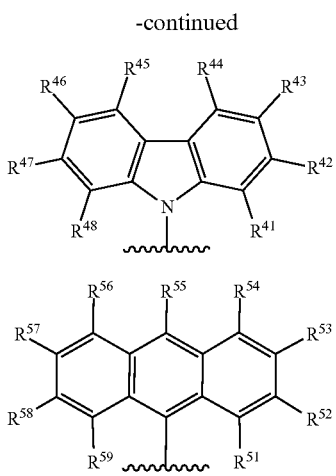

(III)

(IV)

In formulas (II), (III), and (IV), each of $R^{31-35}$, $R^{41-48}$, or $R^{51-59}$ is independently chosen from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^N)_2NC(O)-$, halogen, or $-H$, provided at least one of $R^1$ or $R^8$ is a radical having formula (II), formula (III), or formula (IV).

In formula (I), each of $R^{2-4}$, $R^{5-7}$, and $R^{9-16}$ is independently selected from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^C)_2NC(O)-$, halogen, and $-H$.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl ($-C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

In some embodiments, each of the chemical groups (e.g., X, R, etc.) of the metal-ligand complex of formula (I) may be unsubstituted having no $R^S$ substituents. In other embodiments, at least one of the chemical groups of the metal-ligand complex of formula (I) may independently contain one or more than one $R^S$. In some embodiments, the sum total of $R^S$ in the chemical groups of the metal-ligand complex of formula (I) does not exceed 20. In other embodiments, the sum total of $R^S$ in the chemical groups does not exceed 10. For example, if each $R^{1-5}$ was substituted with two $R^S$, then X and Z cannot be substituted with an $R^S$. In another embodiment, the sum total of $R^S$ in the chemical groups of the metal-ligand complex of formula (I) may not exceed 5 $R^S$. When two or more than two $R^S$ are bonded to a same chemical group of the metal-ligand complex of formula (I), each $R^S$ is independently bonded to the same or different carbon atom or heteroatom and may include persubstitution of the chemical group.

The term "substitution" means that at least one hydrogen atom ($-H$) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "$-H$" means a hydrogen or hydrogen radical that is covalently bonded to another atom. "Hydrogen" and "$-H$" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" (with square brackets) means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl; dihydroindenyl; naphthyl tetrahydronaphthyl; and phenanthrene. Examples of substituted ($C_6$-$C_{40}$)aryl are substituted ($C_1$-$C_{20}$)aryl; substituted ($C_6$-$C_{18}$)aryl; 2,4-bis[($C_{20}$)alkyl]-phenyl; polyfluorophenyl; pentafluorophenyl; and fluoren-9-one-1-yl.

The term "($C_3$-$C_{40}$)cycloalkyl" means a saturated cyclic hydrocarbon radical of from 3 to 40 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene include unsubstituted or substituted ($C_6$-$C_{40}$)arylene, ($C_3$-$C_{40}$)cycloalkylene, and ($C_1$-$C_{40}$)alkylene (e.g., ($C_1$-$C_{20}$)alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of ($C_2$-$C_{20}$)alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of ($C_6$-$C_{50}$) arylene α,ω-diradicals include phenyl-1,4-diyl, napthalen-2,6-diyl, or napthalen-3,7-diyl.

The term "($C_1$-$C_{40}$)alkylene" means a saturated straight chain or branched chain diradical (i.e., the radicals are not on ring atoms) of from 1 to 40 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$—, in which "C*" denotes a carbon atom from which a hydrogen atom is removed to form a secondary or tertiary alkyl radical. Examples of substituted ($C_1$-$C_{50}$)alkylene are substituted ($C_1$-$C_{20}$)alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a ($C_1$-$C_{18}$)alkylene, examples of substituted ($C_1$-$C_{50}$)alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2] octane.

The term "($C_3$-$C_{40}$)cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), $S(O)_2$, $Si(R^C)_2$, $P(R^P)$, $N(R^N)$, —N=C($R^C$)$_2$, —Ge($R^C$)$_2$—, or —Si($R^C$)—, where each $R^C$, each $R^N$, and each $R^P$ is unsubstituted ($C_1$-$C_{18}$)hydrocarbyl or —H. The term "heterohydrocarbon" refers to a molecule or molecular framework in which one or more carbon atoms are replaced with a heteroatom. The term "($C_1$-$C_{40}$)heterohydrocarbyl" means a heterohydrocarbon radical of from 1 to 40 carbon atoms and the term "($C_1$-$C_{40}$)heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each ($C_1$-$C_{50}$) heterohydrocarbyl and ($C_1$-$C_{50}$)heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The ($C_1$-$C_{40}$)heterohydrocarbyl may be unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-S(O)$_2$—, ($C_1$-$C_{40}$)hydrocarbyl-Si($R^C$)$_2$—, ($C_1$-$C_{40}$)hydrocarbyl-N($R^N$)—, ($C_1$-$C_{40}$)hydrocarbyl-P($R^P$)—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_4$-$C_{40}$)heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2, or 3 rings independently are fused or non-fused and at least one of the 2 or 3 rings is heteroaromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4- thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, $S(O)$, and $S(O)_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

Co-Catalyst Component

The catalyst system comprising a metal-ligand complex of formula (I) may be rendered catalytically active by any technique known in the art for activating metal-based catalysts of olefin polymerization reactions. For example, the comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylalumninum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are tri$((C_1-C_{20})$hydrocarbyl$)$-substituted-aluminum or tri$((C_1-C_{20})$hydrocarbyl$)$-boron compounds. In other embodiments, Group 13 metal compounds are tri(hydrocarbyl)-substituted-aluminum, tri$((C_1-C_{20})$hydrocarbyl$)$-boron compounds, tri$((C_1-C_{10})$alkyl$)$aluminum, tri$((C_1-C_{20})$aryl$)$boron compounds, and halogenated (including perhalogenated) derivatives thereof. In further embodiments, Group metal compounds are tris(fluoro-substituted phenyl)boranes, tris(pentafluorophenyl)borane. In some embodiments, the activating co-catalyst is a tris$((C_1-C_{20})$hydrocarbyl borate (e.g. trityl tetrafluoroborate) or a tri$((C_1-C_{20})$hydrocarbyl$)$ammonium tetra$((C_1-C_{20})$hydrocarbyl$)$ borane (e.g. bis(octadecyl)maethylammonium tetrakis(pentafluorophenyl)borane). As used herein, the term "ammonium" means a nitrogen cation that is a $((C_1-C_{20})$ hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H)$_3^+$, or $N(H)_4^+$, wherein each $(C_1-C_{20})$hydrocarbyl, when two or more are present, may be the same or different.

Combinations of neutral Lewis acid activators (co-catalysts) include mixtures comprising a combination of a tri$((C_1-C_4)$alkyl$)$aluminum and a halogenated tri$((C_6-C_{18})$aryl$)$boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate($I^-$) amine, and combinations thereof.

In some embodiments, one or more of the foregoing activating co-catalysts are used in combination with each other. An especially preferred combination is a mixture of a tri$((C_1-C_4)$hydrocarbyl$)$aluminum, tri$((C_1-C_4)$hydrocarbyl$)$ borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

In embodiments herein, the LLDPE has a density in the range of from about 0.910 to 0.940 g/cc. All individual values and subranges from 0.910-0.940 g/cc are included and disclosed herein. For example, in some embodiments, the LLDPE has a density of 0.910-0.935 g/cc. In other embodiments, the LLDPE has a density of 0.910-0.930 g/cc. In further embodiments, the LLDPE has a density of 0.912-0.925 g/cc. Densities disclosed herein are determined according to ASTM D-792.

In embodiments herein, the LLDPE has a melt index of about 1.8-10.0 g/10 min. All individual values and subranges from 1.8-10.0 g/10 min are included and disclosed herein. For example, in some embodiments, the LLDPE has a melt index of 2.0-8.0 or 2.0-6.0 g/10 min. In other embodiments, the LLDPE has a melt index of 2.0-5.0 g/10 min. Melt index, or $I_2$, for ethylene-based polymers is determined according to ASTM D1238 at 190° C., 2.16 kg.

In embodiments herein, the LLDPE has a molecular weight distribution (Mw/Mn) of less than 3.0. All individual values and subranges of less than 3.0 are included and disclosed herein. For example, in some embodiments, the LLDPE may have a molecular weight distribution (Mw/Mn) of from 1.5 to 3.0, from 2.0 to 2.8, or 2.0 to 2.6. In other embodiments, the LLDPE may have a molecular weight distribution (Mw/Mn) of from 2.0 to 2.4. Mw is the weight average molecular weight and Mn is the number average molecular weight, both of which may be measured using gel permeation chromatography (GPC).

In embodiments herein, the LLDPE has a composition distribution breadth index (CDBI) of greater than 60%. All individual values and subranges of greater than 60% are included and disclosed herein. For example, in some embodiments, the LLDPE may have a CDBI of greater than 65%, 77%, or 80%. In other embodiments, the LLDPE may have a CDBI of from 60% to 95%, 65% to 95%, 77% to 90%, or 80% to 90%.

In some embodiments herein, the LLDPE may have a crystallization elution fractionation (CEF) fraction at 70° C. to 90° C. of equal to or greater than 80% of the total CEF fractions.

The film may optionally comprise one or more additives. Such additives may include, but are not limited to, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), cling additives (e.g., PIB (polyisobutylene)), Standostab PEPQ™ (supplied by Sandoz), pigments, colorants, fillers (e.g., calcium carbonate, talc, mica, kaolin, perlite, diatomaceous earth, dolomite, magnesium carbonate, calcium sulfate, barium sulfate, glass beads, polymeric beads, ceramic beads, natural and synthetic silica, aluminum trihydroxide, magnesium trihydroxide, wollastonite, whiskers, wood flour, lignine, starch), $TiO_2$, anti-stat additives, flame retardants, biocides, antimicrobial agents, and clarifiers/nucleators (e.g., HYPERFORM™ HPN-20E, MILLAD™ 3988, MILLAD™ NX 8000, available from Milliken Chemical). The one or more additives can be included in the LLDPE at levels typically used in the art to achieve their desired purpose. In some examples, the one or more additives are included in amounts ranging from 0-10 wt. % of the LLDPE, 0-5 wt. % of the LLDPE, 0.001-5 wt. % of the LLDPE, 0.001-3 wt. % of the LLDPE, 0.05-3 wt. % of the LLDPE, or 0.05-2 wt. % of the LLDPE.

Films

The films described herein may be used in a variety of applications. In some embodiments, the films can be used in hygiene applications, such as diapers, training pants, and adult incontinence articles, or in other similar absorbent garment applications. In other embodiments, the films can be used in medical applications, such as medical drapes, gowns, and surgical suits, or in other similar fabric (woven or nonwoven) applications.

The films described herein may be made via any number of processes including cast machine direction orientation wherein the LLDPE is extruded through a flat die to create a flat solid film and then uniaxially-oriented in the machine direction at an elevated temperature, such as, from 20° C. to 50° C. lower than the melting point of the LLDPE. The films described herein may also be made using blown machine direction orientation whereby the LLDPE is extruded through an annular die and creates a tube of film that can be slit to create a solid flat film and then uniaxially-oriented in the machine direction at an elevated temperature, such as, from 20° C. to 50° C. lower than the melting point of the LLDPE.

A typical extrusion setup consist of having a hopper in the process upstream and the die in the process downstream. The hopper feeds the LLDPE into the barrel of the extruder, which contains the screw. The screw typically can be divided into 3 sections, i.e., the feed section, the compression section, and the metering section. Along the barrel of the extruder, there will be multiple heating zones from the rear to the front. The screw conveys the LLDPE forward while simultaneously melting and compressing the polymer melt inside the barrel of the extruder. The compression ratio of the screw is typically from 2.5 to 3.5. The length to diameter ratio of the barrel for such an extruder setup is 16:1 to 30:1. The extrusion process can occur at temperatures in the range of 160 to 270 degrees Celsius. At the end of the barrel, which is at the downstream end, between the screw and the die, is a breaker plate and screen pack.

In some embodiments, the films described herein may be manufactured as follows: providing an ethylene-based polymeric film having at least one layer comprising at least 65 wt. %, based on total amount of materials present in the at least one layer, of a linear low density polyethylene which exhibits each of the following properties: a CDBI of at least 60%; a melt index, $I_2$, measured according to ASTM D 1238 (2.16 kg @ 190° C.), of 1.8 g/10 min to 10 g/10 min; a density of from 0.910 g/cc to 0.940 g/cc; and a Mw/Mn of less than 3.0; and stretching the film in the machine direction to form a uniaxially-oriented ethylene-based polymeric film, wherein stretching is performed at a draw ratio of 2.5 to 5, and at a draw temperature, Td, of 20° C. to 50° C. less than the peak melting temperature, Tm, of the linear low density polyethylene, wherein the draw ratio is the In embodiments herein, the films described herein may have a thickness of less than 14 gsm. All individual values and subranges of less than 14 gsm are included and disclosed herein. For example, in some embodiments, the film may have a thickness of from 6 to 13 gsm or 8 to 13 gsm. In other embodiments, the film may have a thickness of from 10 to 13 gsm. GSM is the grams per square meter and is the weight per square meter of film.

In embodiments herein, the at least one layer of the film may exhibit a:

$$\frac{\text{Force at 5\% Elongation in } MD}{\text{basis weight of the at least one layer}} (\text{Newton}/gsm) > 0.2083\left(\frac{\text{Newton}}{gsm}\right) \times \text{draw ratio} - 0.04167\left(\frac{\text{Newton}}{gsm}\right)$$

wherein the draw ratio is the $$\frac{\text{cast film thickness prior to stretching}}{\text{cast film thickness after stretching}}$$

and ranges from 2.5 to 5; and
wherein the draw ratio is performed at a draw temperature, Td, of 20° C. to 50° C. less than the peak melting temperature, Tm, of the linear low density polyethylene.

In some embodiments, the at least one layer of the film may exhibit a:

$$\frac{\text{Force at 5\% Elongation in } MD}{\text{basis weight of the at least one layer}} (\text{Newton}/gsm) > 0.2083\left(\frac{\text{Newton}}{gsm}\right) \times \text{draw ratio} + 0.1042\left(\frac{\text{Newton}}{gsm}\right)$$

wherein the draw ratio is the $$\frac{\text{cast film thickness prior to stretching}}{\text{cast film thickness after stretching}}$$

and ranges from 2.5 to 5; and
wherein the draw ratio is performed at a draw temperature, Td, of 20° C. to 50° C. less than the peak melting temperature, Tm, of the linear low density polyethylene.

Composites/Articles

In some embodiments herein are composites comprising the films as described herein laminated to a nonwoven. In some embodiments herein are hygiene articles comprising the composite. In some embodiments herein are hygiene articles comprising the films as described herein. "Nonwoven" includes nonwoven webs, nonwoven fabrics, and any nonwoven structure in which individual fibers or threads are interlaid, but not in a regular or repeating manner. Nonwovens described herein may be formed by a variety of processes, such as, for example, air laying processes, meltblowing processes, spunbonding processes and carding processes, including bonded carded web processes.

Test Methods

Density

Densities disclosed herein may be determined according to ASTM D-792.

Melt Index

Melt index, or $I_2$, may be determined according to ASTM D1238 at 190° C., 2.16 kg. Melt index, or $I_{10}$, may be determined according to ASTM D1238 at 190° C., 10.0 kg.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, J. Polym. Sci., Polym. Letters, 6, 621 (1968)):

$M_{polyethylene} = A \times (M_{polystyrene})^B$, where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

DSC

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (about 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The value determined is peak melting temperature ($T_m$), also known as the melting point. The peak melting temperature is reported from the second heat curve. If multiple peaks are observed, the peak with the highest temperature is used to determine $T_m$.

Crystallization Elution Fractionation (CEF)

Comonomer distribution analysis, also commonly called short chain branching distribution (SCBD), is measured with Crystallization Elution Fractionation (CEF) (PolymerChar, Spain) (Monrabal et al, Macromol. Symp. 257, 71-79 (2007), which is incorporated herein by reference) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B 1378-500 G, batch number 098K0686) from Sigma-Aldrich are obtained. ODCB is distilled before use. Silica gel 40 (particle size 0.2-0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB to dry ODCB. ODCB can be also dried by passing through a column or columns packed with silica gel. For the CEF instrument equipped with an autosampler with $N_2$ purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This "ODCB containing BHT and silica gel" or ODCB dried with silica gel 40 is now referred to as "ODCB." This ODCB is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 µl. The temperature profile of CEF is: Stabilization temperature 110° C., crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 n m±6% (MO-SCI Specialty Products) with ⅛ inch stainless tubing according to U.S. Pat. No. 8,372,931, which is incorporated herein by reference. The column outside diameter (OD) is ⅛ inch. The critical parameters needed to duplicate the method include the column internal diameter (ID), and column length (L). The choice of ID and L must be such that when packed with the 125 µm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 µm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931, which is incorporated herein by reference. CEF data is processed by GPCOne software (PolymerChar, Spain).

Comonomer Distribution Breadth Index (CDBI)

The CDBI is defined as the weight percent of the polymer molecules having a co-monomer content within 50 percent of the median total molar co-monomer content (as reported in WO 93/03093, which is incorporated herein by reference). The CDBI of polyolefins can be conveniently calculated from the short chain branching distribution (SCBD) data obtained from the techniques known in the art, such as, for example, temperature rising elution fractionation ("TREF") as described, for example, by Wild, et al., *Journal of Polymer Science*, Poly. Phys. Ed., Vol. 20, 441 (1982); L. D. Cady, "The Role of Comonomer Type and Distribution in LLDPE Product Performance," *SPE Regional Technical Conference*, Quaker Square Hilton, Akron, Ohio, 107-119 (Oct. 1-2, 1985); or in U.S. Pat. No. 4,798,081 (Hazlitt, et al.) and U.S. Pat. No. 5,008,204 (Stehling), all of which are incorporated herein by reference.

Herein, CDBI is calculated according to the following steps with the SCBD measured by CEF:

(A) Obtain a weight fraction (wT(T)) at each temperature (T) from 20.0° C. to 119.9° C. with a temperature step increase of 0.2° C. from CEF according to the equation $\int_{20.0}^{119.9} wT(T)dT=1.00$ (B) Calculate the median temperature ($T_{median}$) which is at cumulative weight fraction of 0.500 (50%) including soluble fraction. The cumulative weight fraction for the entire elution temperature range (generally between 20.0 to 120.0° C.) is normalized as 1.00.

(C) Calculate the corresponding median total comonomer content in mole % ($C_{median}$) at the median temperature ($T_{median}$) by using comonomer content calibration versus elution temperature.

(D) Construct a comonomer content calibration curve by using a series of reference materials (ethylene-octene copolymers) with known amount of comonomer content, i.e., eleven reference materials with narrow comonomer distribution (mono-modal comonomer distribution in CEF from 35.0 to 119.0° C.) with weight-average Mw (by conventional GPC) of 35,000 to 115,000 (measured via conventional GPC) at a comonomer content ranging from 0.0 mole % to 7.0 mole % are analyzed with CEF at the same experimental conditions specified in CEF experimental sections. The comonomer content of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317, which are incorporated herein by reference.

(E) Construct comonomer content calibration by using the peak temperature ($T_p$) of each reference material and its comonomer content; The calibration of comonomer content calibration versus elution temperature is as shown in Equation (1) wherein: $R^2$ is the correlation constant; T (° C.) is the elution temperature of SCBD measured by CEF.

$$\ln(1 - \text{comonomer content}) = -\frac{207.26}{273.12 + T} + 0.5533 \quad \text{Equation (1)}$$

$$R^2 = 0.997$$

(F) Calculate CDBI as the total weight percentage with a comonomer content ranging from $0.5*C_{median}$ to $1.5*C_{median}$. If the density of the polymer is above 0.94, CDBI is thus defined as 100% (see WO1993003093 A1, which is incorporated herein by reference).

Crystallization Elution Fractionation (CEF) Fraction at 70° C. to 90° C.

Crystallization elution fractionation (CEF) fraction at 70° C. to 90° C. is calculated as $\int_{70}^{90} wT(T)dT$ from CEF.

Film Test Methods

Tensile Test

Tensile properties in both the machine direction (MD) and cross direction (CD) are determined according to ASTM D882 at a crosshead speed of 20 inch/minute. The width of the specimen is 1 inch and initial grip separation is 2 inches. Force at 5% elongation (in Newton) is determined by the load at 5% strain. The break stress is recorded as tensile strength.

Tear Test

Elmendorf tear testing in both the machine direction (MD) and cross direction (CD) was done in accordance with ASTM D1922, type B—constant radius.

Puncture Force

Puncture test is performed using ASTM D 5748, but with a 0.5 inch diameter stainless steel probe. A film specimen is held in a pneumatic clamp with a 4 inch diameter opening at ambient temperature. The impact speed is 10 inch/minute. The force to break the film is recorded as the puncture force.

EXAMPLES

The embodiments described herein may be further illustrated by the following non-limiting examples.

Resin 1

Resin 1 is prepared via solution polymerization in a single loop reactor system as described in U.S. Pat. No. 5,977,251 in the presence of a catalyst system comprising a procatalyst represented by the following formula:

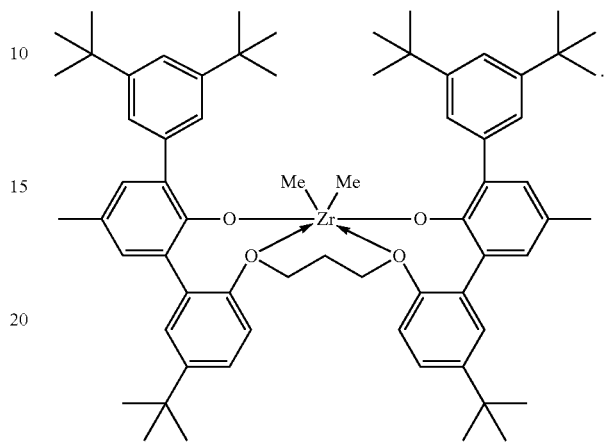

The polymerization conditions for Resin 1 are reported in Tables 1 and 2. Referring to Tables 1 and 2, TEA is triethylaluminum and PETROSOL D 100/120 is a solvent which is commercially available from CEPSA (Compañía Española de Petróleos, S.A.U., Madrid, Spain). Properties of Resin 1 and Comparative Resins are reported in Tables 3A-3C.

TABLE 1

| 1. REACTOR FEEDS | Units | Resin 1 |
|---|---|---|
| Reactor Solvent/Ethylene Feed Flow ratio | g/g | 4.05 |
| Solvent Type Used | | PETROSOED 100/120 |
| Comonomer Type Used | | 1-Hexene |
| Reactor Comonomer/Ethylene Feed Flow ratio | g/g | 0.257 |
| Reactor Fresh Hydrogen/ethylene Feed Flow ratio | g/kg | 0.111 |
| Reactor Control Temperature | ° C. | 155 |
| Reactor Pressure (gauge) | bar | 51.7 |
| Reactor Ethylene Conversion | % | 86.5 |
| Reactor Residence Time | Min | 6.7 |
| Recycle Ratio | | 4.3 |

TABLE 2

| 3. CATALYST | Resin 1 |
|---|---|
| Reactor Co-Catalyst-1/Catalyst Molar feed Ratio | 3.0 |
| Reactor Co-Catalyst-1 Type | bis(hydrogenated tallow alkyl)methyl, tetrakis(pentafluorophenyl)borate(1-)amine |
| Reactor Co-Catalyst-2/Catalyst Molar Ratio | 33 |
| Reactor Co-Catalyst-2 Type | TEA |

Resin Properties

TABLE 3A

| | I₂ (g/10 min) | I₁₀ (g/10 min) | Density (g/cc) | Tm (° C.) | CDBI (%) | CEF fraction between 70 to 90° C. (%) |
|---|---|---|---|---|---|---|
| Resin 1 | 3.2 | 20 | 0.918 | 112 | 84.8 | 91.9 |
| EXCEED ™ 3518, available from ExxonMobil Chemical Company | 3.5 | 20 | 0.918 | 114 | 74.3 | 74.5 |
| DOWLEX ™ 2047G, available from The Dow Chemical Company | 2.3 | 17 | 0.917 | 123 | 50.0 | 47.3 |

TABLE 3B

| | Mn (g/mol) | Mw (g/mol) | Mz (g/mol) | Mw/Mn |
|---|---|---|---|---|
| Resin 1 | 34,311 | 74,994 | 135,975 | 2.2 |
| EXCEED ™ 3518 | 31,011 | 77,092 | 136,662 | 2.5 |
| DOWLEX ™ 2047G | 25,718 | 92,324 | 252,893 | 3.6 |

Films

Monolayer, machine direction-oriented (MDO) films were produced on a Collin cast MDO line using various resins, as shown in Tables 3A & 3B. The film structures are outlined in Table 4.

MDO films were fabricated using a Dr. Collin cast MDO line. The Dr. Collin cast MDO line is equipped with a cast film unit and an online MDO unit. The cast film unit has three extruders (25/30/25 mm) and a slot die (0.7 mm die gap). Monolayer cast films are first produced with the cast film unit at a throughput rate of 2 kg/h. The films are quenched on a chill roll (chill roll temperature=20° C.) in the cast film unit before entering the online MDO unit. In the online MDO unit, the cast films were stretched at various temperatures as indicated in Table 4. The preheat roll temperature in the online MDO unit is set at a temperature that is 15° C. lower than the draw temperature (or stretch temperature). Draw ratios (or stretch ratios) of the MDO films are also varied and shown in Table 4. The draw ratio is defined as the thickness reduction before and after the MDO process. For example, a draw ratio of 3.5 means that the ratio of cast film thickness before it enters the online MDO unit over the final thickness after the MDO is 3.5. Final film thickness (after MDO) is fixed at 13 micron and corresponding basis weight is 12 grams per meter square (gsm), by varying the cast film thickness when different draw ratios are used. For example, for Film 2, the initial cast film thickness is set at 45.5 micron. The basis weight is defined as the weight of a film with an area of 1 meter square.

Films 1, 8 and 15, conventional cast films were made at 13 micron (basis weight is 12 gsm) without MDO. The cast films are collected without going through the online MDO unit. Films 2-7, 9-14, and 16-21 all have a final film thickness after MDO of 13 microns (basis weight is 12 gsm).

The film properties are shown in Tables 5A & 5B below.

Film Structures

TABLE 4

| Films | Resin | Draw Ratio | Draw Temperature (Td)° C. | Tm − Td (° C.) |
|---|---|---|---|---|
| Film 1 | Resin 1 - Control non-MDO | — | — | — |
| Film 2 | Resin 1 | 3.5 | 65 | 47 |
| Film 3 | Resin 1 | 4 | 65 | 47 |
| Film 4 | Resin 1 | 4.5 | 65 | 47 |
| Film 5 | Resin 1 | 3 | 80 | 32 |
| Film 6 | Resin 1 | 3.5 | 80 | 32 |
| Film 7 | Resin 1 | 4 | 80 | 32 |
| Film 8 | EXCEED ™ 3518 - Control non-MDO | — | — | — |
| Film 9 | EXCEED ™ 3518 | 3 | 70 | 44 |
| Film 10 | EXCEED ™ 3518 | 3.5 | 70 | 44 |
| Film 11 | EXCEED ™ 3518 | 4 | 70 | 44 |
| Film 12 | EXCEED ™ 3518 | 3 | 85 | 29 |
| Film 13 | EXCEED ™ 3518 | 3.5 | 85 | 29 |
| Film 14 | EXCEED ™ 3518 | 4 | 85 | 29 |
| Film 15 | DOWLEX ™ 2047G - Control non-MDO | — | — | — |
| Film 16 | DOWLEX ™ 2047G | 3 | 83 | 40 |
| Film 17 | DOWLEX ™ 2047G | 3.5 | 83 | 40 |
| Film 18 | DOWLEX ™ 2047G | 4 | 83 | 40 |
| Film 19 | DOWLEX ™ 2047G | 3 | 98 | 25 |
| Film 20 | DOWLEX ™ 2047G | 3.5 | 98 | 25 |
| Film 21 | DOWLEX ™ 2047G | 4 | 98 | 25 |

Results

TABLE 5A

Film Properties

| Films | Tensile Strength in MD (MPa) | Tensile Strength in TD (MPa) | Tear MD (N) | Puncture Force (N) | Force at 5% Elongation in MD (N) |
|---|---|---|---|---|---|
| Film 1 | 49 | 32 | 0.4 | 18 | 1.9 |
| Film 2 | 140 | 24 | 2.4 | 31 | 12.4 |
| Film 3 | 123 | 25 | 2.2 | 34 | 11.7 |
| Film 4 | 151 | 25 | 2.6 | 44 | 13.5 |
| Film 5 | 98 | 29 | 1.6 | 39 | 9.1 |
| Film 6 | 112 | 29 | 1.6 | 39 | 10.1 |
| Film 7 | 153 | 27 | 2.2 | 42 | 12.2 |
| Film 8 | 40 | 40 | 1.2 | 37 | 1.6 |
| Film 9 | 100 | 35 | 1.2 | 35 | 7.5 |
| Film 10 | 115 | 30 | 1.5 | 41 | 9.9 |
| Film 11 | 117 | 30 | 1.6 | 49 | 10.9 |
| Film 12 | 87 | 35 | 0.6 | 36 | 7.5 |
| Film 13 | 90 | 32 | 0.8 | 43 | 8.6 |
| Film 14 | 117 | 31 | 1.1 | 48 | 9.9 |
| Film 15 | 43 | 30 | 2.0 | 25 | 2.4 |
| Film 16 | 101 | 29 | 1.4 | 33 | 6 |
| Film 17 | 127 | 29 | 1.6 | 39 | 7.6 |
| Film 18 | 119 | 30 | 2.0 | 41 | 8.8 |
| Film 19 | 84 | 26 | 1.1 | 32 | 5.6 |
| Film 20 | 108 | 28 | 1.1 | 36 | 7.9 |
| Film 21 | 116 | 30 | 1.2 | 37 | 9.1 |

TABLE 5B

Film Properties

| Films | Force at 5% Elongation in MD/ film basis weight (N/gsm) | 0.2083 × draw ratio − 0.04167 (N/gsm) | 0.2083 × draw ratio + 0.1042 (N/gsm) |
|---|---|---|---|
| Film 1 | 0.158 | — | — |
| Film 2 | 1.033 | 0.688 | 0.833 |

TABLE 5B-continued

Film Properties

| Films | Force at 5% Elongation in MD/ film basis weight (N/gsm) | 0.2083 × draw ratio − 0.04167 (N/gsm) | 0.2083 × draw ratio + 0.1042 (N/gsm) |
|---|---|---|---|
| Film 3 | 0.975 | 0.792 | 0.938 |
| Film 4 | 1.125 | 0.896 | 1.042 |
| Film 5 | 0.758 | 0.583 | 0.729 |
| Film 6 | 0.842 | 0.688 | 0.833 |
| Film 7 | 1.017 | 0.792 | 0.938 |
| Film 8 | 0.133 | — | — |
| Film 9 | 0.625 | 0.583 | 0.729 |
| Film 10 | 0.825 | 0.688 | 0.833 |
| Film 11 | 0.908 | 0.792 | 0.938 |
| Film 12 | 0.625 | 0.583 | 0.729 |
| Film 13 | 0.717 | 0.688 | 0.833 |
| Film 14 | 0.825 | 0.792 | 0.938 |
| Film 15 | 0.200 | — | — |
| Film 16 | 0.500 | 0.583 | 0.729 |
| Film 17 | 0.633 | 0.688 | 0.833 |
| Film 18 | 0.733 | 0.792 | 0.938 |
| Film 19 | 0.467 | 0.583 | 0.729 |
| Film 20 | 0.658 | 0.688 | 0.833 |
| Film 21 | 0.758 | 0.792 | 0.938 |

The inventive film has excellent film properties (e.g., MD tensile strength, MD tear, puncture resistance, modulus), which allow for downgauging of films while maintaining the desired performance of the article fabricated from the film.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "13 microns" is intended to mean "about 13 microns."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A uniaxially-oriented ethylene-based polymeric film having at least one layer comprising at least 65 wt. %, based on total amount of materials present in the at least one layer, of a linear low density polyethylene (LLDPE) which exhibits each of the following properties:
a comonomer distribution breadth index (CDBI) of at least 60%;
a melt index, $I_2$, measured according to ASTM D 1238 (2.16 kg @190° C.), of 1.8 g/10 min to 10 g/10 min;
a density of from 0.910 g/cc to 0.940 g/cc; and
a Mw/Mn of less than 3.0; and
wherein the LLDPE has a crystallization elution fractionation (CEF) fraction at 70° C. to 90° C. of equal to or greater than 80% of the total CEF Fractions.

2. The film of claim 1, wherein the at least one layer exhibits the following characteristic:

$$\frac{\text{Force at 5\% Elongation in MD}}{\text{basis weight of the at least one layer}}(\text{Newton}/gsm) >$$
$$0.2083\left(\frac{\text{Newton}}{gsm}\right) \times \text{draw ratio} - 0.04167\left(\frac{\text{Newton}}{gsm}\right)$$

wherein the draw ratio is the $$\frac{\text{cast film thickness prior to stretching}}{\text{cast film thickness after stretching}}$$

and ranges from 2.5 to 5; and wherein the draw ratio is performed at a draw temperature, Td, of 20° C. to 50° C. less than the peak melting temperature, Tm, of the linear low density polyethylene.

3. The film of claim 1, wherein the at least one layer exhibits the following characteristic:

$$\frac{\text{Force at 5\% Elongation in MD}}{\text{basis weight of the at least one layer}}(\text{Newton}/gsm) >$$
$$0.2083\left(\frac{\text{Newton}}{gsm}\right) \times \text{draw ratio} + 0.1042\left(\frac{\text{Newton}}{gsm}\right)$$

wherein the draw ratio is the $$\frac{\text{cast film thickness prior to stretching}}{\text{cast film thickness after stretching}}$$

and ranges from 2.5 to 5; and wherein the draw ratio is performed at a draw temperature, Td, of 20° C. to 50° C. less than the peak melting temperature, Tm, of the linear low density polyethylene.

4. The film of claim 1, wherein the LLDPE has a CDBI of greater than 77% or, alternatively, greater than 80%.

5. The film of claim 1, wherein the film has an overall thickness of less than 14 gsm.

6. The film of claim 1, wherein the film is a monolayer film.

7. The film of claim 1, wherein the film is a multilayer film.

8. A composite comprising the film of claim 1 laminated to a nonwoven.

9. A hygiene article comprising the film of claim 1.

* * * * *